US010301154B2

(12) United States Patent
Mupende et al.

(10) Patent No.: US 10,301,154 B2
(45) Date of Patent: *May 28, 2019

(54) HOIST DRUM AND ROPE PULLEY FOR FIBER ROPE DRIVES

(71) Applicant: LIEBHERR-COMPONENTS BIBERACH GMBH, Biberach an der Riss (DE)

(72) Inventors: Ilaka Mupende, Neu-Ulm (DE); Horst Zerza, Biberach an der Riβ (DE)

(73) Assignee: Liebherr-Components Biberach GMBH, Biberach an der Riss (DE)

( * ) Notice: Subject to any disclaimer, the term of this patent is extended or adjusted under 35 U.S.C. 154(b) by 152 days.

This patent is subject to a terminal disclaimer.

(21) Appl. No.: 15/663,390

(22) Filed: Jul. 28, 2017

(65) Prior Publication Data
US 2017/0327355 A1 Nov. 16, 2017

Related U.S. Application Data

(63) Continuation of application No. 13/950,210, filed on Jul. 24, 2013, now Pat. No. 9,758,358, which is a (Continued)

(30) Foreign Application Priority Data

Jan. 24, 2011 (DE) .................... 20 2011 001 845 U

(51) Int. Cl.
*B66D 1/30* (2006.01)
*B66D 1/36* (2006.01)
(Continued)

(52) U.S. Cl.
CPC ................. *B66D 1/30* (2013.01); *B66D 1/34* (2013.01); *B66D 1/36* (2013.01); *F16H 55/50* (2013.01)

(58) Field of Classification Search
CPC .... B66D 1/30; B66D 1/34; B66D 1/36; F16H 55/50
See application file for complete search history.

(56) References Cited

U.S. PATENT DOCUMENTS 2,413,817 A 1/1947 Firth
3,279,762 A 10/1966 William
(Continued)

FOREIGN PATENT DOCUMENTS

CN 1294271 9/1977
CN 1587012 3/2005
(Continued)

*Primary Examiner* — Michael E Gallion
(74) *Attorney, Agent, or Firm* — Levine Bagade Han LLP

(57) ABSTRACT

The present invention relates generally to rope drives working with high-strength fiber ropes such as crane hoists, boom adjustment gear, trolley traveling gear, etc. The invention in this respect in particular applies to hoist drums for the rope hoist winch of such a fiber rope drive having a drum jacket body which is provided with grooving at the peripheral side and having two guard plates adjacent to the drum jacket body at the end sides. The invention further relates to a rope pulley for such a fiber rope drive having a rotatably supported pulley body whose jacket surface has at least one rope groove. In accordance with the invention, the rope grooves have a flat-pressed, round groove contour which differs from the circular and which has a larger radius of curvature in the region of the groove base than in the region of the groove flanks adjacent thereto.

20 Claims, 7 Drawing Sheets

Related U.S. Application Data continuation of application No. PCT/EP2012/000312, filed on Jan. 24, 2012.

(51) Int. Cl.
  *B66D 1/34*        (2006.01)
  *F16H 55/50*       (2006.01)

(56) References Cited

U.S. PATENT DOCUMENTS

| | | |
|---|---|---|
| 3,332,665 A | 7/1967 | Bruns |
| 3,762,725 A | 10/1973 | Taylor |
| 3,843,096 A | 10/1974 | Wilson et al. |
| 3,934,482 A | 1/1976 | Byers |
| 4,045,001 A | 8/1977 | Harvey, Jr. |
| 4,614,332 A | 9/1986 | Wilson |
| 4,638,958 A | 1/1987 | Furomoto |
| 4,688,765 A | 8/1987 | Guangorena |
| 4,693,453 A | 9/1987 | Ivan |
| 4,753,322 A | 6/1988 | Yasuda |
| 4,789,136 A | 12/1988 | Connelly et al. |
| 4,944,463 A | 7/1990 | Raasch |
| 5,489,254 A | 2/1996 | Lob |
| 5,511,447 A | 4/1996 | Galloway et al. |
| 5,538,224 A | 7/1996 | Powell et al. |
| 5,611,522 A | 3/1997 | Zaguroli |
| 5,730,425 A | 3/1998 | Brooks |
| 6,371,448 B1* | 4/2002 | De Angelis |
| 6,435,480 B1 | 8/2002 | Allen |
| 7,712,584 B2 | 5/2010 | Aulanko et al. |
| 7,757,817 B2 | 7/2010 | Ach |
| D621,240 S | 8/2010 | Lutter et al. |
| D735,020 S | 7/2015 | Bradford |
| 9,187,298 B2 | 11/2015 | DeSoo et al. |
| 9,758,358 B2 | 9/2017 | Mupende et al. |
| 2003/0085391 A1* | 5/2003 | Noske |
| 2004/0178398 A1 | 9/2004 | Miller et al. |
| 2004/0256180 A1 | 12/2004 | Eichhorn et al. |
| 2005/0218388 A1 | 10/2005 | Zacharias |
| 2009/0114893 A1 | 5/2009 | Lange |
| 2012/0018690 A1 | 1/2012 | Maire et al. |
| 2012/0228571 A1 | 9/2012 | Curchod |
| 2012/0318615 A1 | 12/2012 | Aulanko et al. |
| 2014/0027691 A1 | 1/2014 | Ilaka et al. |
| 2014/0070154 A1 | 3/2014 | Win et al. |
| 2015/0291403 A1 | 10/2015 | Ervin |

FOREIGN PATENT DOCUMENTS

| | | |
|---|---|---|
| CN | 101607680 | 12/2009 |
| CN | 201381193 | 1/2010 |
| CN | 201610357 | 10/2010 |
| CN | 201704008 | 1/2011 |
| DE | 127206 | 9/1977 |
| DE | 2738655 | 3/1978 |
| DE | 9002251 | 6/1990 |
| DE | 000019903094 | 3/2000 |
| DE | 102005004816 A1 | 8/2006 |
| DE | 202008011359 | 1/2010 |
| DE | 102013006108 | 10/2014 |
| JP | 2593513 | 3/1997 |
| JP | 4516546 | 8/2010 |
| WO | WO 2008/040349 | 4/2008 |

* cited by examiner

HOIST DRUM AND ROPE PULLEY FOR FIBER ROPE DRIVES

CROSS-REFERENCE TO RELATED APPLICATIONS

This application is a continuation of U.S. patent application Ser. No. 13/950,210 filed 24 Jul. 2013, which is a continuation of PCT Application No. PCT/EP2012/000312 filed 24 Jan. 2012, which claims priority to German Patent Application No. 20 2011 001 845.8 filed 24 Jan. 2011, each of which is herein incorporated by reference in its entirety.

BACKGROUND

1. Technical Field

The present invention relates generally to rope drives working with high-strength fiber ropes such as crane hoists, boom adjustment gear, trolley traveling gear, etc. The invention in this respect in particular applies to hoist drums for the rope hoist winch of such a fiber rope drive having a groove drum jacket body which is provided with grooving at the peripheral side and having two guard plates adjacent to the drum jacket body at the end sides. The invention further relates to a rope pulley for such a fiber rope drive having a rotatably supported pulley body whose jacket surface has at least one rope groove.

2. Description of Related Art

An attempt has been being made for some time, in particular with cranes, to replace the customary heavy steel ropes with high-strength fiber ropes which consist of high-strength synthetic fibers such as aramid fibers (HMPA), aramid/carbon fiber composites, high-modulus polyethylene fibers (HMPE) or poly(p-phenylene-2,6-benzobisoxazole) fibers (PBO) or which at least comprise such fibers. Since the weight of the rope itself to be taken into account for the payload is smaller, the payload or the permitted lifting load can be increased due to the weight saving over steel ropes. Particularly with cranes having large lifting heights or boom or mast adjustment gear using pulley blocks of a high reeve number, considerable rope lengths and thus also a corresponding rope weight arise so that the weight reduction possible through high-strength fiber ropes is very advantageous.

However, the predisposition to wear and the secure recognition of the discard state have been problematic with such high-strength fiber ropes up to now. With the same rope diameter, steel ropes and high-strength fiber ropes of synthetic fibers have almost the same tensile strength; however, the steel wires have a significantly higher hardness than the fibers of the high-strength fiber ropes. A smaller transverse compressive stiffness of the high-strength fiber ropes results from this which are substantially softer and thereby not as resistant to wear as steel ropes if the rope is wound onto a drum or runs over rope pulleys, which can result in much higher wear at the high-strength fiber ropes.

In this respect, the region in which the hoist rope is wound onto or off the hoist drum in one or more layers as well as the region in which the rope runs around a rope pulley are particularly susceptible to wear. If the rope is coiled onto the drum jacket body of the hoist drum under load in the first layer, a relative movement results between the drum groove and the rope due to the stretching of the rope. A similar behavior results with a multilayer winding, with here rope then sliding on rope, which likewise results in friction and wear. A further wear region is the rope layer change when the rope is deflected by the drum guard plates.

To reduce friction wear, steel ropes are as a rule already greased in the rope arrangement, with a regular regreasing also being necessary in operation. A small coefficient of friction is obtained by this greasing and thus low wear in the winding of the ropes, especially the friction of the rope toward the drum body, the rope-on-rope friction and the friction on the running onto the guard plate or on the running onto the rope deflector is reduced. The same also applies to rope pulleys. A greased sliding of steel on steel thus has the great advantage of a low coefficient of friction and hereby low wear. This advantage of greasing cannot be used on the use of fiber ropes of plastic fibers in conjunction with hoist drums and rope pulleys.

With the hoist drum construction design for multilayer widening most frequently used at cranes, the drum jacket body is designed with a special grooving which allows a clean winding in a plurality of layers. The grooving in this respect has two pitch regions oppositely disposed viewed over the drum circumference and having a region of extent of around 90° in each case as well as two parallel regions which are likewise oppositely disposed and likewise have an extent of around 90° in each case. Each of the pitch regions in this respect provides a groove offset of around half a rope diameter.

Conventional hoist drums of the named kind are known, for example, from the document DE 101 32 611 A1 in which the pitch regions provided between the parallel regions have intercrossing grooves to allow a winding up of the rope both clockwise and counter clockwise. Furthermore, a hoist drum is known from DE 10 2005 004 816 A1 in which only the parallel region is actually provided with a grooving, while the pitch region is formed without grooves so that there the obliquely offset rope sections lie on a smooth, non-grooved jacket surface. Furthermore, DE 20 2008 011 359 U1 describes a hoist drum for a crane lifting gear, wherein an run-in guide is associated with the hoist drum in the run-in region of the rope and is formed from two oppositely disposed rollers while leaving a gap free whose gap width largely corresponds to the rope diameter. The named rope guide can be moved transversely, i.e. in parallel to the axis of rotation of the hoist drum, to ensure the desired winding quality. The previously addressed problems of the increased rope wear on the use of high-strength fiber ropes, however, remains unsolved in these already known hoist drums.

SUMMARY OF THE INVENTION

It is the underlying object of the present invention to provide an improved fiber rope drive, an improved hoist drum for such a fiber rope drive and/or an improved rope pulley for such a fiber rope drive which avoid the disadvantages of the prior art and advantageously further develop the latter. The wear on high-strength fiber ropes should in particular be reduced without impairing the winding quality.

This object is solved in accordance with the invention by a hoist drum in accordance with claim 1, by a rope pulley in accordance with claim 13 and by a fiber rope drive in accordance with claim 15. Preferred embodiments of the invention are the subject of the dependent claims.

It is therefore proposed to allow the cross-sectional change which occurs under transverse load at high-strength fiber ropes and to adapt the grooving of the hoist drum and/or of the rope pulley thereto and also not to even attempt to hold the rope in its ideal, typical circular cross-section by support. In accordance with the invention, the rope grooves have a pressed-flat, round groove contour which differs from the circular and which has a larger radius of curvature in the region of the groove base than in the region of the groove flanks adjacent thereto. In this respect, a departure is made from the previously customary path of supporting the rope, which is circular in cross-section before running onto the drum, by grooves of a circular contour on the hoist drum, the consideration rather forms the starting point that a fiber rope is no longer tensioned after running onto the hoist drum, but is also acted on by transverse forces and consequently an ovalization of the rope cross-section is adopted. The rope grooving is no longer adapted to the ideal, typically circular rope cross-section under a purely tensional load, but is rather adapted to the actual rope cross-section under tensile load and a transverse load on the hoist drum. A more uniform, better distributed pressure loading can hereby be achieved which can reduce the wear of the fiber rope.

In an advantageous further development of the invention, the flattened groove contour can have an approximately oval or ovalized shape or also an elliptical shape, when the groove contour is observed in cross-section. The transition regions between two adjacent grooves are also advantageously rounded with a radius which is as large as possible so that no angled pressing onto the rope cross-section occurs even with a run-out of the rope offset slightly to the groove. Alternatively to the named oval contouring of the rope grooves, a groove contour can also be provided which has a flattening at the groove base and/or has polygonal kinks viewed in cross-section whose approximately flat surface segments are set at a flat angle toward one another and preferably merge into one another in rounded form. The surface segments, including the flattened portions, are, however, here also advantageously arranged such that an enveloping surface nestled thereat has a larger radius of curvature in the aforesaid manner in the region of the groove base than in the region of the groove flanks adjacent thereto and/or a larger radius of curvature than the rope in the non-deformed, circular starting state.

The amount of the flattening or of the pressing flat of the groove contour can be adapted to the respective design and to the structure of the fiber rope and its transverse deformation. A good compromise for different types of fiber ropes comprises in a further development of the invention that the ratio of the groove width to the groove depth is selected in the region from 3-7, preferably 4-6, and in particular approximately 5, i.e. with a provided groove width of 10 mm, for example, the groove depth would amount to 2 mm. The groove depth is here to be understood as the distance of the lowest point of a groove from an imaginary connecting straight line which connects the two flank peaks.

Alternatively or additionally, the groove contouring can be made such that the pitch spacing of the grooving, i.e. the spacing of the centers of two adjacent grooves from one another, amounts to approximately 104% to 111%, preferably approximately 106% to 110%, particularly preferably 108%, of the mean rope diameter when it is measured with a circular, non-deformed rope cross-section. The named groove spacing or pitch distance of the grooving is advantageously matched to the adopted ovalization of the fiber rope cross-section.

To minimize the friction wear which occurs on the rope by the friction between the drum surface and the rope surface as a consequence of the rope stretching on the winding up onto the hoist drum, the grooving and/or the parts of the hoist drum contacting the rope is/are advantageously provided with a low-friction, preferably an approximately friction-free surface so that the rope can slide along the grooving surface or the guard plate surface free of wear. Such a low-friction surface can be achieved either by a very fine working of the surface, for example by polishing or grinding, and/or by a corresponding surface coating. Such a friction-reducing design of the rope-contacting drum surfaces generally also brings about considerable advantages without the aforesaid ovalized groove contour and can in particular, however, also be used in conjunction with the named ovalized groove contour. The rope-contacting surfaces of the hoist drum, in particular the grooving and the guard plate are advantageously finely-machined and/or surface-coated in the region of the deflector provided thereat such that the mean roughness depth Ra amounts to less than 1 μm, preferably less than 0.35 μm, in particular approximately 0.15 μm to 0.18 μm.

If the rope-contacting drum surface is provided with a friction-reducing surface coating in the aforesaid manner, a plastic coating can in particular be used. The surface coating is advantageously not only friction-reducing, but also damping in order to reduce peaks in the surface pressing and/or blows onto the rope running on.

In an advantageous further development of the invention, the surface coating can be of a multilayer design, with advantageously a topmost coating layer being friction-reducing, while at least one coating layer lying directly or indirectly thereunder is damping.

For example, a plastic jacketing can, for example, be vulcanized onto a drum jacket body produced from steel, for example, to generate a damped rope running and a low coefficient of friction to the rope. Alternatively or additionally, compound designs of the drum body are also possible, for example from fiber-reinforced composite materials such as GRP and CFRP which can optionally also be combined with steel sheet metal layers, with optionally plastic jacketings of the aforesaid kind also being able to be applied to such a composite drum. Alternatively, pure plastic drums can also be used, e.g. from fiber-reinforced plastic such as GRP and CFRP.

The grooving of the drum jacket body can generally have different designs. For example, a grooving which is conventional per se could be provided which has, viewed over the drum circumference, two oppositely disposed crossing and pitch regions and two oppositely disposed parallel regions, wherein the named pitch regions and parallel regions can each be formed with an angle of approx. 90°, i.e. can extend over around 90° of the drum circumference in each case. In this respect, the groove pitch in each pitch region changes by around half a rope diameter, wherein here the ovalized groove contour of the flat-pressed, ovalized rope diameter having to be used as the basis.

In an advantageous further development of the invention, however, a grooving can only be provided with one pitch region and one parallel region, wherein the grooves are offset by around one full rope diameter in the named one pitch region, wherein here in turn the enlarged, ovalized rope diameter is also advantageously to be used as the basis again. Only one intersection region hereby results viewed over the drum circumference. This allows an inexpensive, good, multilayer rope coiling having a high wind quality and low rope wear.

To reduce the wear of the rope on the deflection into the next layer at the guard plates, a rope deflector having a preferably multistage deflection extent can be provided at least one of the guard plates. Using such a rope deflector at the guard plate, it is avoided that the rope rises spirally at the guard plate and then drops abruptly onto the winding plane and it is instead insured that the rope is immediately guided into the next layer on reaching the guard plate. The rope deflector is in this respect arranged such that it deflects the rope back inwardly onto the next rope layer at the end of the drum rope groove or at the end of the rope layer, wherein the strength or thickness of this rope deflector can be based on the rope deflection angle on the drum, wherein a thicker rope deflector is provided with a smaller deflection angle than with larger deflection angles. Depending on the deflection angle, the thickness of the named rope deflector can lie in the range between 5% and 50% of the rope diameter.

The named multistage deflector extent is advantageously configured such that a deflection section rising in wedge shape follows a deflector section extending in parallel and is turn followed by a deflector section extending in parallel, in each case either directly or indirectly with the interposition of other deflector sections and/or cut-outs. In a further development of the invention, a rope deflector having three sections viewed over the circumference can in particular be provided at the respective guard plate, of which three sections a first section has a parallel flank in parallel with the rotation plane standing perpendicular on the drum axis, a middle section has a wedge flank rising in wedge shape and a last section in turn has a parallel flank.

In an alternative further development of the invention, an only two-stage deflector extent can be provided, in particular such that the rope deflector has, in addition to the named deflector section inclined in wedge shape, a further deflection section having a parallel flank which extends substantially in parallel to the rotation plate standing perpendicular on the drum axis, wherein the named parallel flank can adjoin the named wedge flank radially inwardly or radially outwardly. In a preferred further development of the invention, the named parallel flank at the guard plate is in this respect provided radially within the wedge flank so that the rope running onto the guard plate first runs on at the parallel flank and is then deflected inwardly back by the wedge flank only on reaching the wedge flank. With such a two-stage deflector extent, the named parallel flank and the named wedge flank can extend in each case in an order of magnitude of around 40% to 60% of the guard plate height.

In accordance with a further alternative embodiment of the invention, the guard plate can also have a substantially only single-stage deflector extent, with a wedge flank being provided with such a single-stage configuration which extends substantially over the total guard plate height.

Depending on the configuration of the deflector extent, the named wedge flank can adopt different pitch angles. A wedge flank angle which works advantageously for different configurations can lie in a further development of the invention in the range from 2° to 6°, preferably around 2° to 4°.

The named parallel flanks and wedge flanks or parallel/wedge sections can extend over differently sized guard plate sections. In accordance with an advantageous embodiment of the invention having a multistage deflector extent of the aforesaid kind, the rope can run, when it runs on at the guard plate, in parallel outwardly in a first stage over around 30% to 60% of the guard plate radius, whereas in the further extent, between around 60% to 80% of the radius, a wedge surface extending all round deflects the rope inwardly, said wedge surface advantageously rising in a flat curve up to a thickness of around 5% to 50% of the rope diameter. A further region extending in parallel then comes after this inwardly directed wedge ring surface which can optionally be configured spirally at the circumference. All transitions between the different sections of the rope deflector are advantageously rounded in a notch-free manner.

In order also to keep the rope wear low at the pivot point of the rope at the hoist drum, a clamping tight of the rope at the beating-up point is dispensed with in a further development of the invention and instead a loop-shaped beating up of the rope is provided. A rope end fastening means at the hoist drum can in particular comprise a bollard-like attachment, for example in the form of a spigot, a screw or a pipe sleeve, at which a rope end loop provided at the rope end can be hung in. The named rope end loop can advantageously be spliced into the rope and/or be formed by splicing.

BRIEF DESCRIPTION OF THE DRAWINGS

The invention will be explained in more detail in the following with respect to a preferred embodiment and to associated drawings. There are shown in the drawings.

DETAILED DESCRIPTION

The hoist drum 1 shown in the Figures comprises an, in rough terms, cylindrical drum jacket body 2 to whose axial ends respective guard plates 3 are connected which, in rough terms, extend perpendicular to the longitudinal drum axis and project radially outwardly from the drum jacket surface and have a much larger diameter than the drum jacket.

The hoist drum 1 shown can in this respect in particular be used in the lifting gear of a crane such as a revolving tower crane or a mobile telescopic crane or a boom mast adjustment gear, but also in other hoist winches.

The named guard plates 3 can generally be connected in different manners to the drum jacket body 2. For example, a single-piece production would be conceivable, with advantageously, however, the guard plates 3 being able to be subsequently joined to the drum jacket body 2. In the drawn embodiment, the guard plates 3 are placed onto the drum jacket body 2 at the end face and are fastened using fastening means in the form of bolts.

Figure 1:
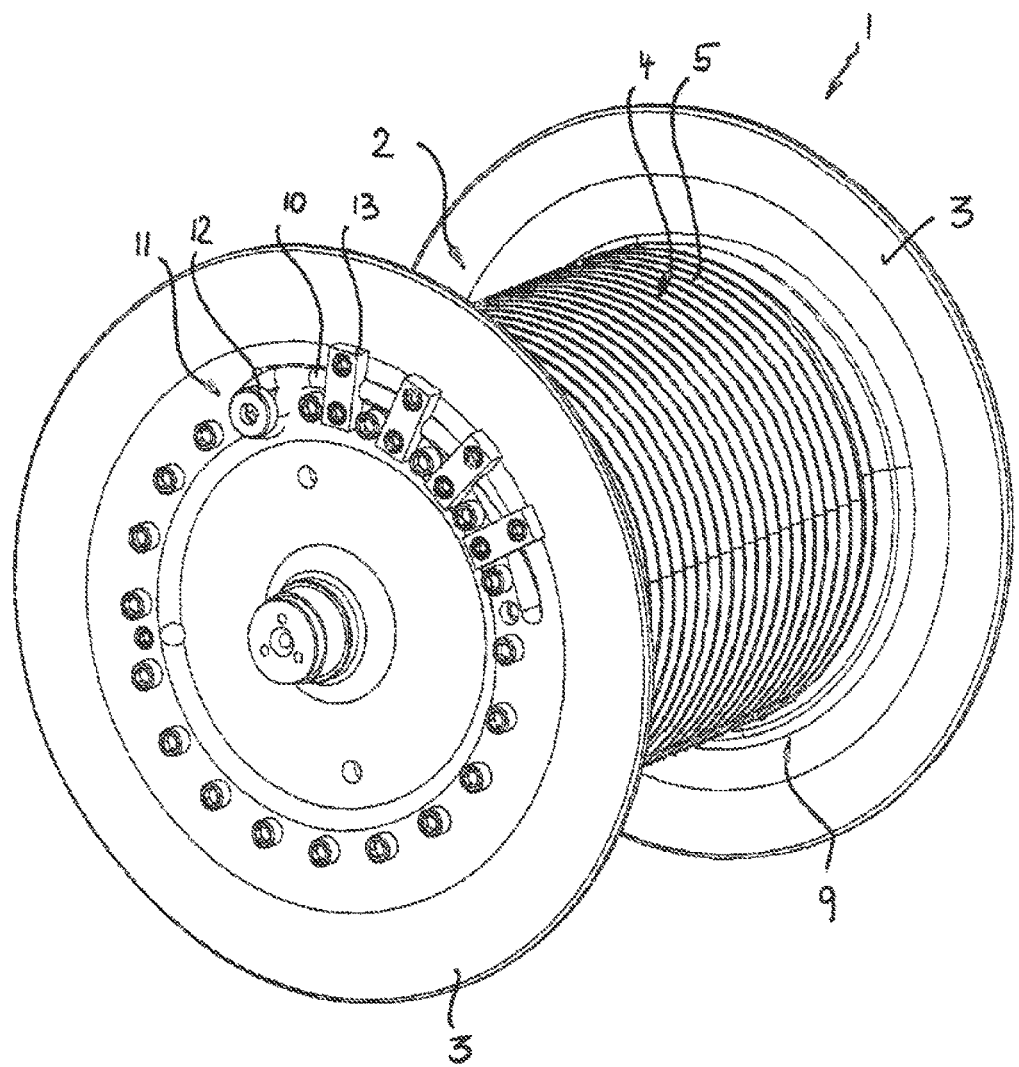
FIG. 1 is a schematic, perspective representation of a hoist drum in accordance with an advantageous embodiment of the invention which shows the grooving of the drum jacket, the rope deflector flanks provided at the inner side of the guard plates and the rope end fastening by means of a rope end loop.
Figure 2:
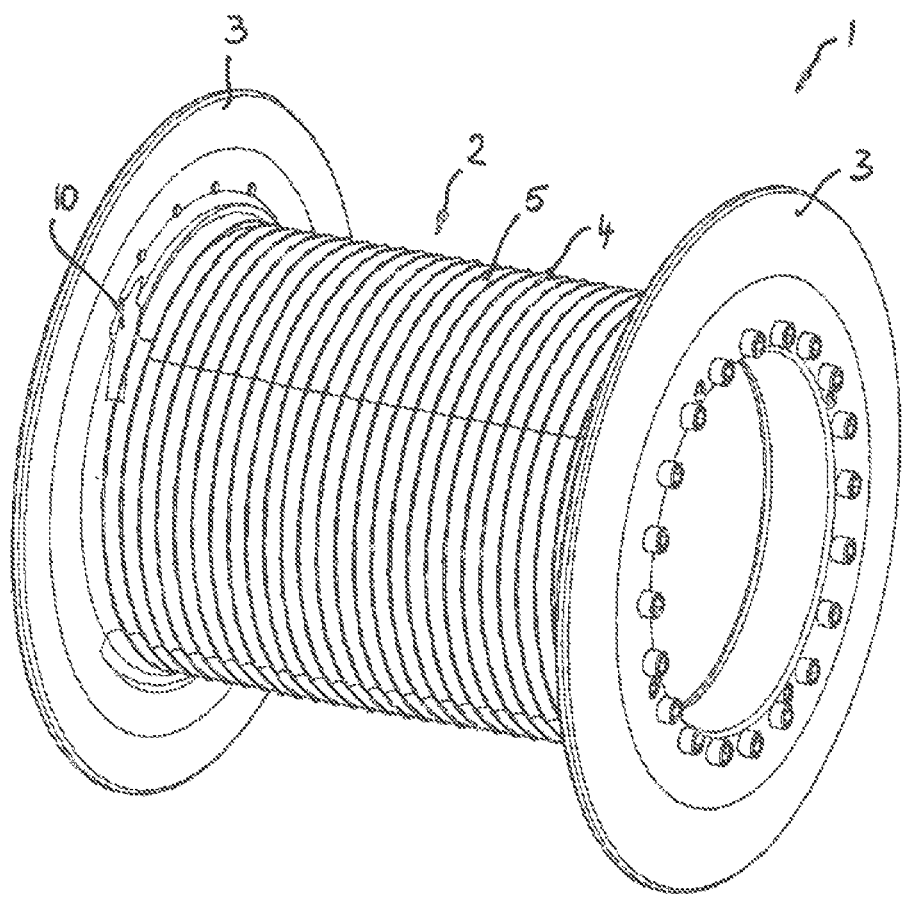
FIG. 2 is a schematic, perspective representation of the hoist drum from a different direction of gaze which shows the grooving of the drum jacket and the leading of the rope end through the guard plate.
Figure 3:
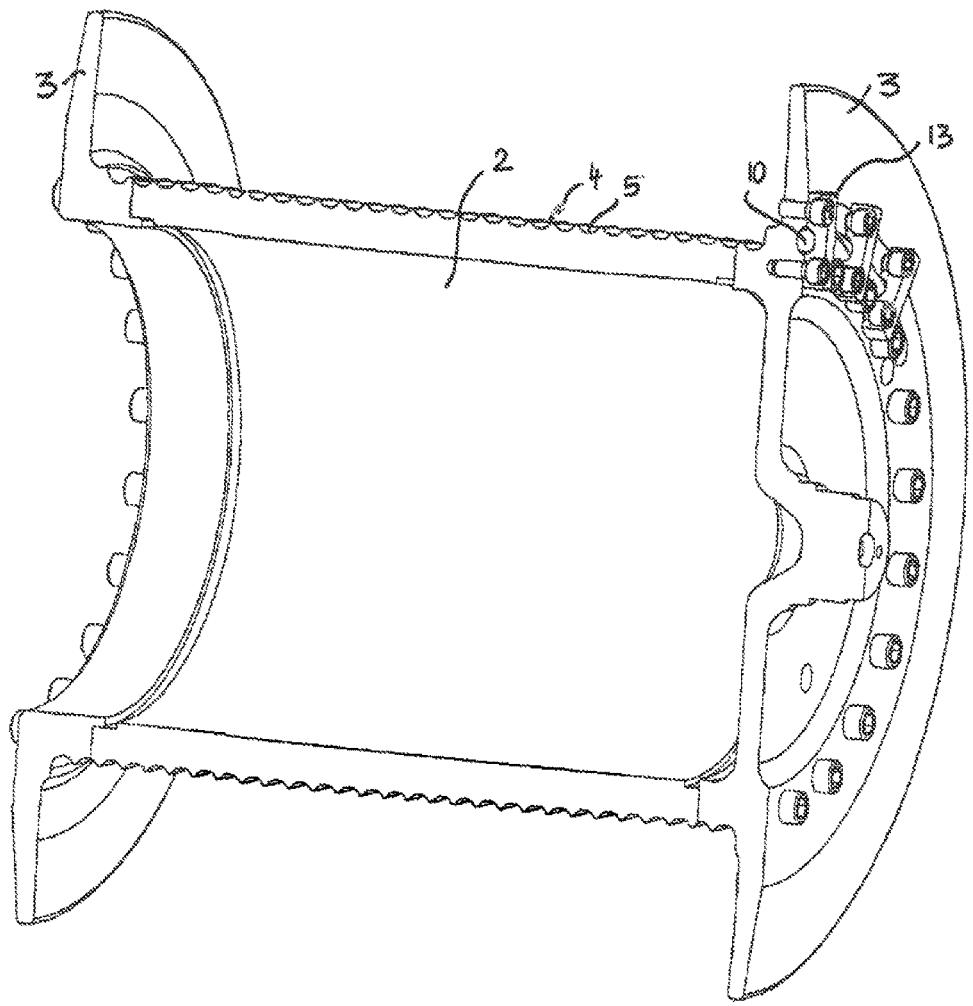
FIG. 3 is a schematic, perspective representation of the hoist drum of the preceding Figures in a sectional view which shows the transition region between the drum jacket body and the guard plates adjacent thereto at the end sides.
Figure 4:
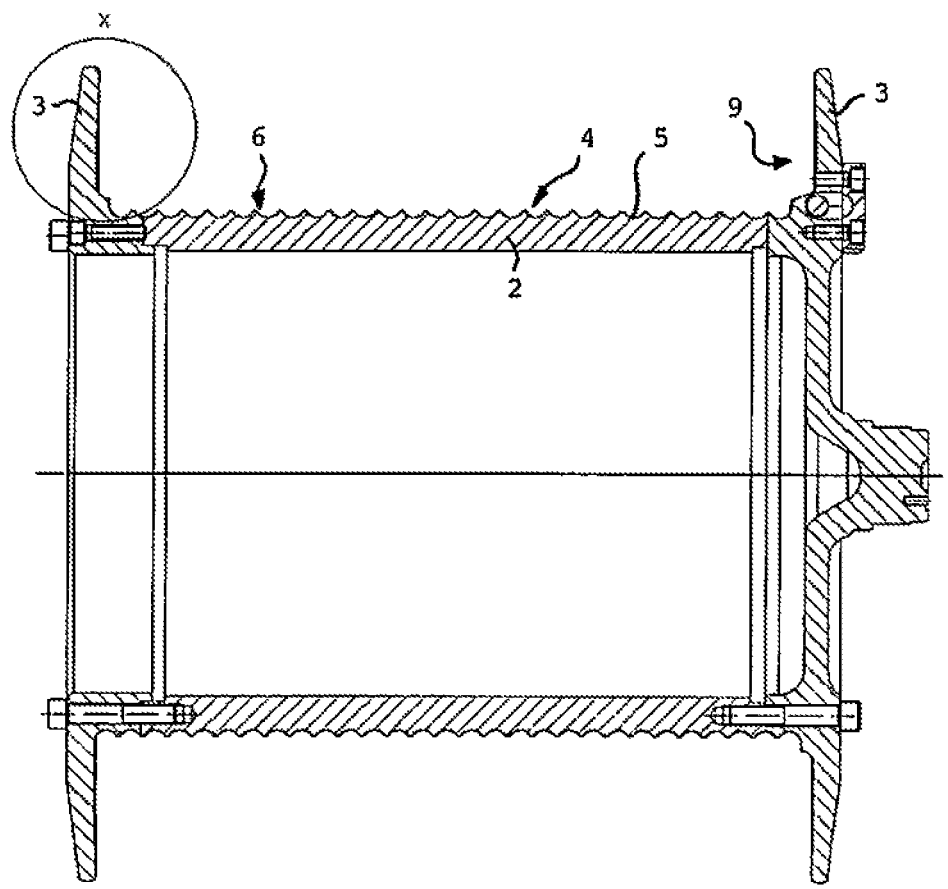
FIG. 4 is a longitudinal section through the hoist drum of the preceding Figures which shows the connection of the guard plates to the drum jacket body and the transition region provided there between the jacket grooving and the rope deflector at the guard plates.

The drum jacket body 2 is provided with a grooving 4 whose rope grooves 5 extend over the total drum jacket body 2, cf. FIGS. 1 and 2. The named grooving 4 can in this respect in the drawn embodiment advantageously only have one intersection region or pitch region in which the rope grooves 5 have a groove pitch of around one full rope diameter. In the remaining circumferential region, the rope grooves 5 extend substantially parallel to a plane in each case standing perpendicular on the longitudinal drum axis so that the grooving 4 has only one rope intersection region and only one parallel region overall.

Figure 5:
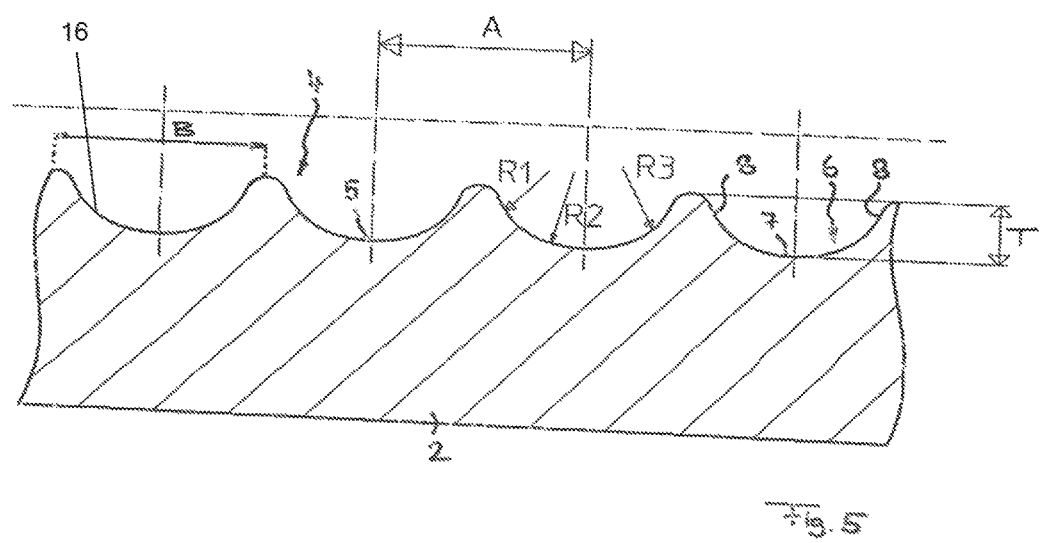
FIG. 5 is a detailed, enlarged sectional view of the drum grooving.

As can best be seen in FIG. 5, the rope grooves 5, viewed in cross-section, have a flat-pressed, in particular approximately oval or ovalized groove contour 6 which differs from the circular shape. The groove contour 6 approximately based on an oval or on an oval segment in this respect includes a flattened portion or a region with a much larger radius of curvature R2 in the region of the groove base 7, whereas in the region of the groove flanks 8 adjacent to the right and to the left, a much smaller radius of curvature R1 or R3 respectively is provided as is known with oval or elliptical contours. In the drawn embodiment, the ratio of groove width B to groove depth T is around 5, with this width-to-depth ratio being able to be selected differently in dependence on the transverse deformation properties of the fiber rope, for example in the range from 3-7, preferably 4-6, to achieve the best possible adaptation to the rope cross-section deforming under transverse pressure on the hoist drum.

The pitch spacing or groove spacing of the grooving 4 is designated by A in FIG. 5 and is likewise matched to the flat-pressed ovalized rope cross-section which is adopted with transverse pressure on the rope. The said groove spacing A advantageously amounts to around 104% to 111%, preferably around 106% to 110%, particularly preferably 108%, of the rope diameter when the named rope diameter is assumed as circular in an idealized manner with a purely tensile load.

To reduce the friction between the rope and the drum surface which also results with an ideal coiling up due to the rope stretching, the surfaces contacting the rope are ground, polished or very finely machined in another manner, in particular in the region of the grooving 4 and of the inner surfaces of the guard plates 3, in order to achieve a very small coefficient of friction and/or very small mean roughness depths. Such a very fine surface machining can in particular be sensible when the hoist drum is produced from steel or from another metallic material, but can also be provided with other material choices for the hoist drum.

Alternatively or additionally, the rope-contacting surface of the hoist drum 1 can be provided, in particular in the region of the grooving 4 or in the region of the inner sides of the guard plates 3, with a friction-reducing and/or stiffness-reducing surface coating 16, for example in the form of a plastic coating applied by vulcanizing or a plastic additivated with carbon, which is advantageously not only friction-reducing, but also damping to damp or reduce blows onto the rope and/or local surface pressing peaks. Advantageously in this respect, a multicoated or multilayer surface coating can be provided in which a damping coating of a soft, rubber-elastic or otherwise deformable material is applied beneath the friction-reducing coating disposed at the surface. Alternatively or additionally, the strength-giving body or body part of the hoist drum can also be produced fully from plastic, for example a fiber-reinforced plastic such as CFRP or GRP. As mentioned above, other compound constructions can also be provided.

In order also to reduce the wear on a rope layer change when the rope is deflected by the guard plates 3, rope deflectors 9 are provided at the inner sides at the guard plates 3 and advantageously have a deflector extent over a plurality of stages. At the end of the jacket groove or at the end of the rope layer, the named rope deflector 9 comprises a deflector flank which is provided at the inner side of the corresponding guard plate 3 and which first extends in a first deflector section 90*a* in parallel with the plane of rotation which stands perpendicular on the longitudinal drum axis and which can extend, for example, over around 30% to 60% of the drum radius. In a second deflector section 90*b*, the named deflector flank then merges into a wedge surface which presses the rope running onto it inwardly. This inwardly projecting wedge ring surface is followed by a further deflector section 90*c* in which the named deflector flank can advantageously in turn extend in parallel with the named plane of rotation perpendicular to the longitudinal drum axis. The named wedge flank of the central deflector section 90*b* can extend inwardly inclined at an angle of inclination a of some few degrees, preferably around 2° to 6°, cf. FIG. 6, and can in this respect take up a region of around 60% to 80% of the plate radius.

Figure 6:
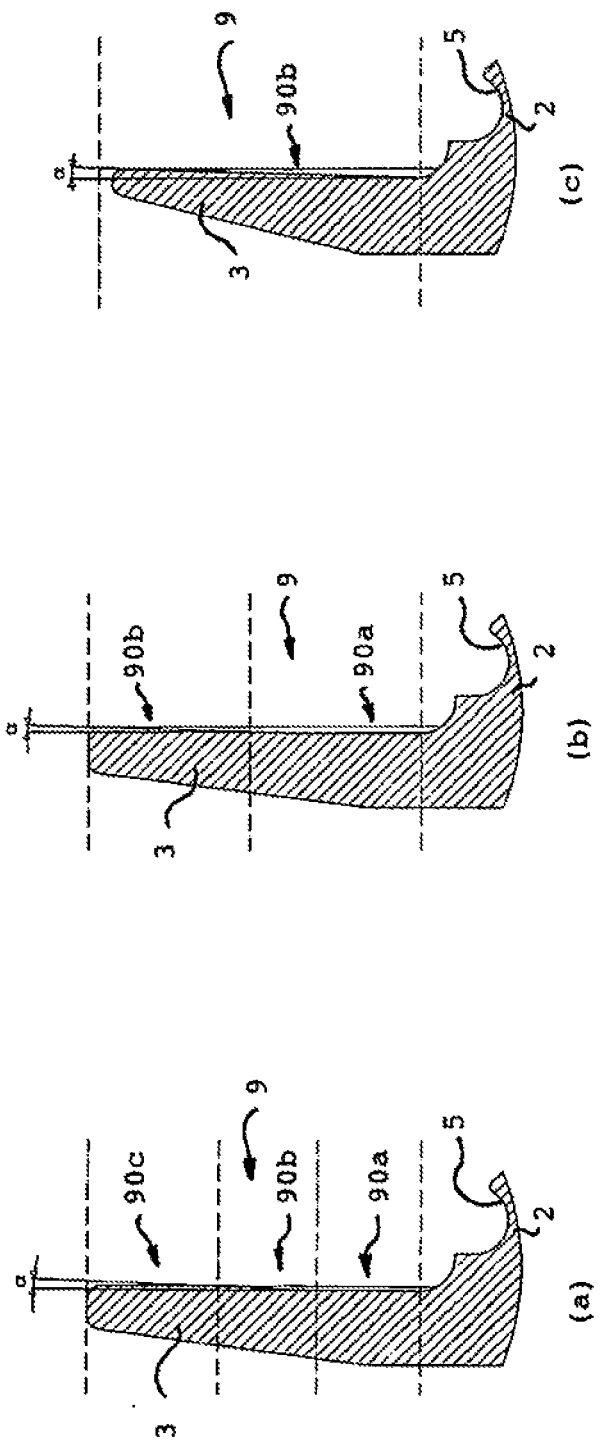
FIG. 6 is a detailed, enlarged sectional view of the transition region between the drum jacket body and guard plate which shows the rope deflector provided at the guard plate in another region.

Alternatively to the described embodiment shown in the partial view (a) of FIG. 6, the named rope deflector 9 can also have an only two-stage deflector extent, such as the partial view (b) of FIG. 6 shows. The deflector flank can in particular have an inner deflector section 90*a* in which the deflector flank extends in parallel to the plane of rotation perpendicular on the longitudinal drum axis. The named inner deflector section 90*a* can in this respect take up around half the height of the guard plate 3. A further deflector section 90*b* can be provided adjoining the former radially outwardly and the deflector flank forms a wedge surface in it which is inclined in the aforesaid manner at the angle α, cf. FIG. 6, partial view (b). The named wedge flank in section 90*b* can extend over the outer half of the guard plate height.

As the partial view (c) of FIG. 6 shows, the rope deflector 9 can also substantially only have one deflector section 90*b* which in this case is advantageously formed as a wedge flank which is inwardly tilted at the angle α to press the rope running onto it inwardly back. In the embodiment in accordance with FIG. 6 (*c*), the wedge flank extends substantially over the total height of the guard plate 3.

The fastening of the rope end to the hoist drum 1 can be seen from FIG. 1. The rope 10 is guided in the rope run-in region, which FIG. 2 shows, through a rope leadthrough in the form of a cut-out in the guard plate 3 through the named guard plate 3 on its outer side. The rope 10 is beaten up or hung in at a bollard-like rope end fastening means 11 on the outer side of the named guard plate 3. For this purpose, the rope 10 has a rope end loop which is advantageously formed by splicing and which is hung in over the bollard-like rope attachment 12. The rope 10 can be guided through rope guiding means 13, cf. FIG. 1, which are located on the outer side of the guard plate 3, between the rope end fastening point which is defined by the named bollard-like rope attachment 12 and the aforesaid leadthrough through the guard plate 3. The rope loop can be secured by a plate adapted in diameter to the rope loop at the named bollard-like rope attachment 12, said plate being secured, for example, by means of a spacer sleeve on the outer side of the guard plate 3 so that a sufficiently large distance is provided between the guard plate and the named securing plate to avoid any crushing or clamping of the rope 10 in the region of the rope loop.

Figure 7:
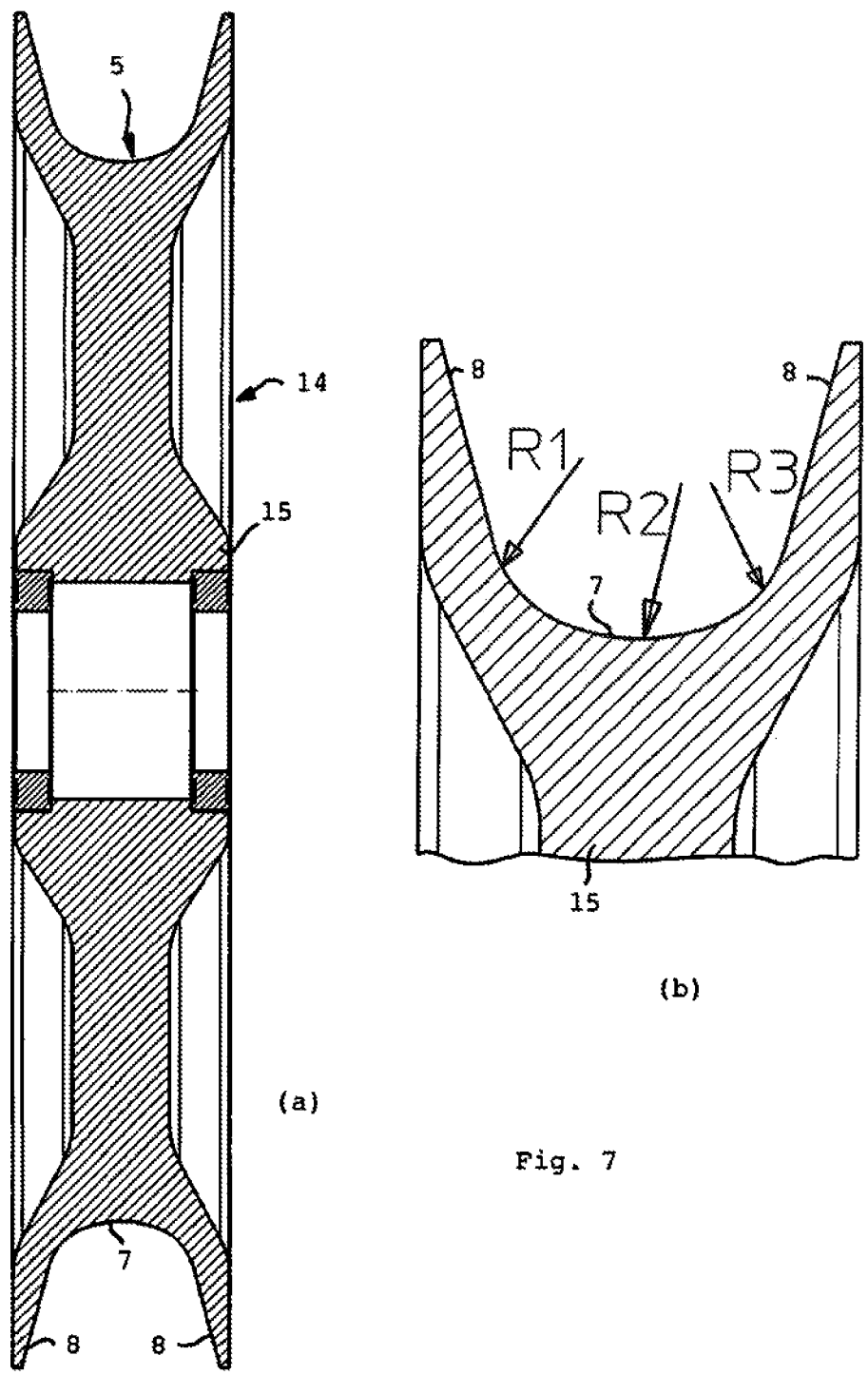
FIG. 7 is a schematic side view of a rope pulley in accordance with an advantageous embodiment of the invention which shows the ovalized groove contouring.

FIG. 7 shows a rope pulley 14 which comprises a drum-like or plate-like roller body 15 which is rotatably supported in a manner known per se and which can be fastened to the boom of a crane, for example. The named roller body 15 comprises on its outer jacket surface a rope groove 5 which has an ovalized groove contour analog to the rope grooves 5 of the hoist drum 1. Reference can be made in this respect to the preceding description. The rope-contacting surface of the roller body 15 is advantageously polished, ground or fine machined in another manner, in particular in the region of the rope groove 5, analog to the hoist drum 1 to obtain a friction-reducing surface. Alternatively or additionally, the named rope-contacting surface of the rope pulley 14 can be provided with a friction-reducing and/or damping surface coating. Reference can also be made in this respect to the preceding description.

As the detailed partial view (b) of FIG. 7 shows, the rope pulley 14 also advantageously has a rope groove 5 whose ovalized groove contour has a larger radius of curvature R2 in the region of the groove base 7 than in the side flank sections adjacent thereat in which the radius of curvature R1 or R3 becomes smaller, cf. FIG. 7 (b).

We claim:

1. A hoist drum for a hoist winch of a fiber rope drive comprising:
   a drum jacket body at the circumferential side with a grooving having at least one rope groove having a groove base and groove flanks;
   two guard plates adjacent to the drum jacket body at the end sides, wherein the at least one rope groove of the grooving has, viewed in cross-section, a flat-pressed groove contour which differs from the circular form and which has a larger radius of curvature at the groove base than at the groove flanks adjacent to the groove base; and
   a segment of rope wound around the drum jacket body, wherein the rope has a substantially circular cross-section under no load and a non-circular substantially ovalized and/or elliptical cross-section when wound around the drum jacket body under load,
   wherein the flat-pressed groove contour is shaped to receive the segment of rope per rope groove,
   wherein a cross-sectional contour of the groove base comprises a flattened portion of a curve, and wherein the cross-sectional contour of the groove base and a cross-sectional contour of the groove flanks are shaped to receive the non-circular ovalized and/or elliptical cross-section of the rope when wound around the drum jacket body under load, and
   wherein the cross-sectional contour of the groove base and the cross-sectional contour of the groove flanks each contact the non-circular ovalized and/or elliptical cross-section of the rope when wound around the drum jacket body under load.

2. The hoist drum of claim 1, wherein the groove contour of the rope groove is ovalized and/or elliptical in shape.

3. The hoist drum of claim 1, wherein the groove contour at the groove base has a flattened portion and/or polygonal kinks with surface areas inclined at a flat angle to one another and rounded transitions.

4. The hoist drum of claim 1, wherein a ratio of a groove width (B) to a groove depth (T) of the rope groove is from 3 to 7.

5. The hoist drum of claim 1, wherein a ratio of a groove width (B) to a groove depth (T) of the rope groove is from 4 to 6.

6. The hoist drum of claim 1, wherein a ratio of a groove width (B) to a groove depth (T) of the rope groove is 5.

7. The hoist drum of claim 1, wherein a pitch spacing (A) of the grooving is from 104% to 111% of a mean rope diameter when this rope diameter is measured with a circular, non-deformed rope cross-section.

8. The hoist drum of claim 1, wherein a pitch spacing (A) of the grooving is from 106% to 110% of a mean rope diameter when this rope diameter is measured with a circular, non-deformed rope cross-section.

9. The hoist drum of claim 1, wherein the grooving and/or parts of the hoist drum contacted by the rope has/have a machined surface having a mean roughness depth of≤1 µm.

10. The hoist drum of claim 1, wherein the groove flanks support opposite sides of the non-circular ovalized and/or elliptical cross-section of the rope when wound around the drum jacket body under load.

11. The hoist drum of claim 1, wherein the cross-sectional contour of the groove base and the cross-sectional contour of the groove flanks support opposite sides of the non-circular ovalized and/or elliptical cross-section of the rope when wound around the drum jacket body under load.

12. The hoist drum of claim 1, wherein the groove flanks support opposite sides of the non-circular ovalized and/or elliptical cross-section of the rope at the same time when the rope is wound around the drum jacket body under load.

13. The hoist drum of claim 1, wherein the cross-sectional contour of the groove base and the cross-sectional contour of the groove flanks support opposite sides of the non-circular ovalized and/or elliptical cross-section of the rope at the same time when the rope is wound around the drum jacket body under load.

14. The hoist drum of claim 1, wherein the groove flanks of each rope groove are separated by a flank distance from 104% to 111% of a mean rope diameter as measured with a circular, non-deformed rope cross-section of the rope.

15. The hoist drum of claim 1, wherein the grooving, viewed over the circumference of the drum jacket body, comprises one pitch region in which the rope grooves are offset by one rope diameter and one parallel region in which the rope grooves are substantially parallel to a plane perpendicular to a longitudinal drum axis.

16. The hoist drum of claim 1, wherein a rope deflector is provided at at least one of the guard plates and has at least one deflector section, viewed over the height of the guard plate, and wherein the guard plate has a wedge flank.

17. The hoist drum of claim 14, wherein the rope deflector has a further deflector section comprising a parallel flank adjoining the wedge flank radially inwardly and/or radially outwardly of the further deflector section with the wedge flank.

18. A rope pulley for a fiber rope drive comprising:
   a rotatably supported roller body having a jacket surface, wherein the jacket surface has at least one rope groove having a groove base and groove flanks, and wherein the rope groove, viewed in cross-section, has a flat-pressed non-circular groove contour, and wherein the groove contour has a larger radius of curvature in the region of the groove base than in the region of the groove flanks,
   a segment of rope wound around the jacket surface, wherein the rope has a substantially circular cross-section under no load and a non-circular substantially ovalized and/or elliptical cross-section when wound around the jacket surface under load,
   wherein the groove contour is shaped to receive the segment of rope per rope groove, and
   wherein a cross-sectional contour of the groove base comprises a flattened portion of a curve, and wherein the cross-sectional contour of the groove base and a cross-sectional contour of the groove flanks are shaped to receive the non-circular ovalized and/or elliptical cross-section of the rope when wound around the drum jacket body under load, and wherein the cross-sectional contour of the groove base and the cross-sectional contour of the groove flanks each contact the non-circular ovalized and/or elliptical cross-section of the rope when wound around the drum jacket body under load.

19. The rope pulley of claim 18, wherein the groove contour at the groove base has a flattened portion and/or polygonal kinks with surface areas inclined at a flat angle to one another and rounded transitions.

20. A rope drive comprising:
a crane lifting gear;
the hoist drum of claim 1; and/or
at least one rope pulley of claim 18.

* * * * *